UNITED STATES PATENT OFFICE.

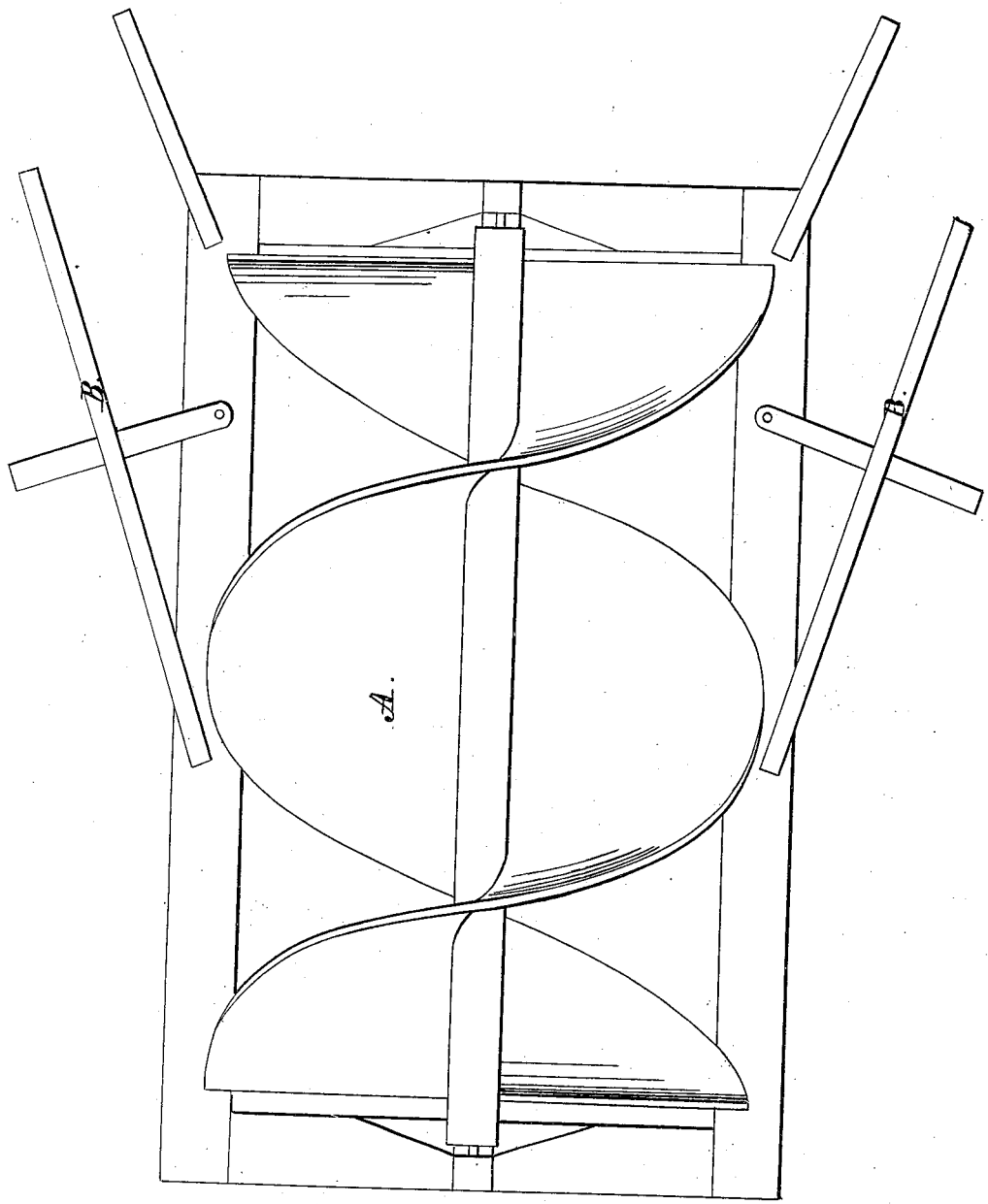

NOADIAH W. HUBBARD, OF RANDOLPH, OHIO.

IMPROVEMENT IN CURRENT WATER-WHEELS, BEING A PLAN FOR GIVING INCREASED POWER TO SUCH WHEELS.

Specification forming part of Letters Patent No. 2,027, dated April 2, 1841.

*To all whom it may concern:*

Be it known that I, NOADIAH W. HUBBARD, of Randolph, in the county of Portage and State of Ohio, have invented a new Plan for Giving Increased Power to a Current Water-Wheel; and I do hereby declare that the following is a full and exact description.

To enable others skilled in the art to make and use my improvement, I will proceed to describe its construction and operation.

I construct my water-wheel on the plan of the pod of an auger (as in the drawing, the wheel is marked A) by means of inserting uprights or arms into the shaft of the wheel to stand at right angles, or nearly so, with the shaft. These arms are inserted at suitable distances to support boards or plank, which I spring onto them and fasten by pinning or otherwise. The angle of the screw or bucket should be about forty-five degrees with the shaft, calculating from the middle of the bucket.

I fasten this wheel in the current of a stream with the shaft in the direction of the current. Upon each side of this wheel I place regulators or chutes (marked B) at an angle (as a medium) of about twenty degrees with the shaft of the wheel. I usually make these chutes in width equal to the diameter of the wheel at least. These chutes may be made by framing four small sticks of timber together in a square form with ribs inserted sufficiently near together to support boards which are to be nailed upon them. These chutes may be fastened to the frame-work of the wheel or they may be made by driving piles into the earth and fastening boards upon them, so that the plane of the chute will be at an angle of about twenty degrees with the current of the stream and shaft of the wheel.

The number of the chutes necessary for a wheel depends upon the length of the wheel. It is desirable that the chutes should increase in length as they extend down the wheel, in order that they may take the current farther and farther into the stream; but if the chutes are all of one length each chute will receive a fresh current which was not within the chute above it on account of the increased column and current of water in the center, which gives the water a tendency toward the center in an angle bearing some proportion to the angle of the chutes. The chutes should be placed two by two, one each side of the wheel, bearing the same relation to each other and the wheel, so that the column of water when it comes to the center may have the same direction of the wheel. The object and benefits of these chutes are to destroy any eddies that may exist in the current, to destroy any eddies which the wheel would make without them, and to increase the column and current of water on the wheel.

The wheel should be built in diameter according to the depth of the stream and of a length according to the amount of power desired.

The wheel may be fastened to the bed of the stream entirely out of the way of floodwood. The shaft which takes the power from the wheel may be inclined at the same angle with the bank of the stream and there be protected. These chutes can be hung upon swivels, so as to turn according to the direction of the water, thereby adjusting themselves to tide-water.

The wheel may be placed in the water so as to vary from a direct line with the current; but power will be lost in proportion to the variation.

The angles of the buckets of the wheel may vary according to the current or motion required, and may be made of other materials than what I have described.

The size, length, angle, frequency, and position of the chutes may and should be varied, and the manner in which they should be varied will readily appear to the mechanic who takes into consideration the velocity of the current, size of the wheel, &c.

I am aware that the force of the current to be thrown upon a wheel has been increased by chutes placed at an angle with the axis of the wheel, so as to concentrate the current upon it, and this I do not therefore claim as my invention; but What I do claim as my invention, and desire to secure by Letters Patent, is—

The employment of two or more sets of chutes or regulators, in combination with a spiral wheel, so as to throw the current upon different parts of the thread or spiral along its length, substantially as herein described.

NOADIAH W. HUBBARD.

Witnesses:
W. THOMPSON,
JOHN LYNCH.